March 3, 1970   J. A. BENEKE ET AL   3,498,424
MULTIPLE SPEED MECHANICAL TRANSMISSION SYSTEM
Filed Oct. 2, 1967   3 Sheets-Sheet 1

United States Patent Office 3,498,424
Patented Mar. 3, 1970

3,498,424
MULTIPLE SPEED MECHANICAL
TRANSMISSION SYSTEM
Jene A. Beneke and John C. Flanagan, Dallas, Tex., assignors to Verson Manufacturing Company, Dallas, Tex., a corporation of Texas
Filed Oct. 2, 1967, Ser. No. 672,249
Int. Cl. F16d *67/00;* F16h *3/08*
U.S. Cl. 192—4                                                17 Claims

ABSTRACT OF THE DISCLOSURE

A two-speed mechanical transmission having a driving shaft rotated by a flywheel at one speed, with a clutch mounted at the end of the driving shaft and selectively operable to directly connect the driving shaft with a coaxially aligned driven shaft. An intermediate shaft is disposed parallel to the driven shaft and includes a rotatably mounted idler gear. The idler gear is selectively operable in dependency on the clutch for transmitting rotative motion around the clutch to rotate the driven shaft at another speed. A brake is located on the end of the driven shaft to allow selective breaking. In one embodiment, a gear on the driven shaft imparts rotative motion to the intermediate shaft, which in turn drives a parallel output shaft.

Field of the invention

This invention relates to mechanical transmission systems, and more particularly to mechanical transmission systems for press brakes wherein a plurality of different forward speeds may be imparted to a rotating press brake output shaft.

The prior art

Press brake systems are commonly used wherein a rotating shaft reciprocately drives a die member into a mold in order to press sheet material into the mold shape. In order to keep the sheet material from whipping about during the pressing operation, limit switches are used to sense the position of the die member and to correspondingly vary the speed of the rotating shaft. Further, it is often necessary to stop the reciprocation of the die member at the top of its stroke in order to allow sheet material to be inserted. In press brake systems heretofore developed, complex transmission systems utilizing planetary gears and the like have been used to vary the speed of the rotating drive shaft. In addition to maintenance and installation problems due to the complexity and resulting high inertia of the press brake transmission systems heretofore utilized, response problems have often arisen due to the fact that a plurality of rotating parts of the transmission systems have been required to be stopped in order to stop the reciprocating die member.

Systems have heretofore been developed for selectively varying the speed at which a driving shaft rotates a coaxially aligned driven shaft by the utilization of back-to-back clutches connected between the two shafts in combination with a geared intermediate shaft disposed parallel to the two shafts. Disclosures and detailed descriptions of exemplary systems are contained in U.S. Patent 1,015,639, issued Jan. 23, 1912; U.S. Patent 1,186,745, issued June 13, 1916; U.S. Patent 2,320,960, issued June 1, 1949; and U.S. Patent 2,600,043, issued Dec. 8, 1945. While such systems have been found to provide sufficient speed control for general applications, relatively large braking forces have often been required for such systems due to the relatively large inertia of the clutches and the driving flywheels of the systems. Further, such systems have not been heretofore adapted for advantageous use with press brake systems.

In most previously developed transmission systems utilizing back-to-back clutches, an intermediate shaft is disposed parallel to the aligned shafts and includes integral gears for transmitting motion around the back-to-back clutches to the driven shaft. The output shaft rotation from such systems has generally been provided directly from the driven shaft, and any additional gearing which is desired must be accomplished with the addition of bulky and rather complex gearing systems. The need has thus arisen for a mechanical transmission system of the type described which provides additional gearing to a rotating output shaft without the requirement of bulky gearing systems, and which also may be easily braked due to the fact that portions of the transmission are allowed to continuously rotate. Additionally, a need has long existed for a simple, yet efficient transmission system adapted for utilization in a press brake system.

SUMMARY

In accordance with the present invention, a plural speed mechanical transmission system includes a driving shaft rotated at a first speed and a driven shaft coaxially aligned with the driving shaft. A clutch device mounted on the end of the driven shaft is selectively operable to connect the shafts for rotation of the driven shaft at a first speed. An intermediate shaft disposed parallel to the driven shaft includes a freely rotatable idler gear which is operable in dependency on the clutch to transmit torque from the driving shaft around the clutch to rotate the driven shaft at a second speed. A brake is mounted on the end of the driven shaft opposite the driving shaft and is selectively operable to apply a braking force to the driven shaft. In one embodiment, the intermediate shaft includes a gear for receiving rotative motion from the driven shaft to provide compact and efficient gearing to an output shaft. In another embodiment, a novel hydraulic system operates a back-to-back clutch device to provide a plural speed transmission system.

THE DRAWINGS

For a more complete understanding of the present invention and for further objects and advantages thereof, reference may now be had to the following description taken in conjunction with the accompanying drawings in which.

THE PREFERRED EMBODIMENTS

Figure 1:
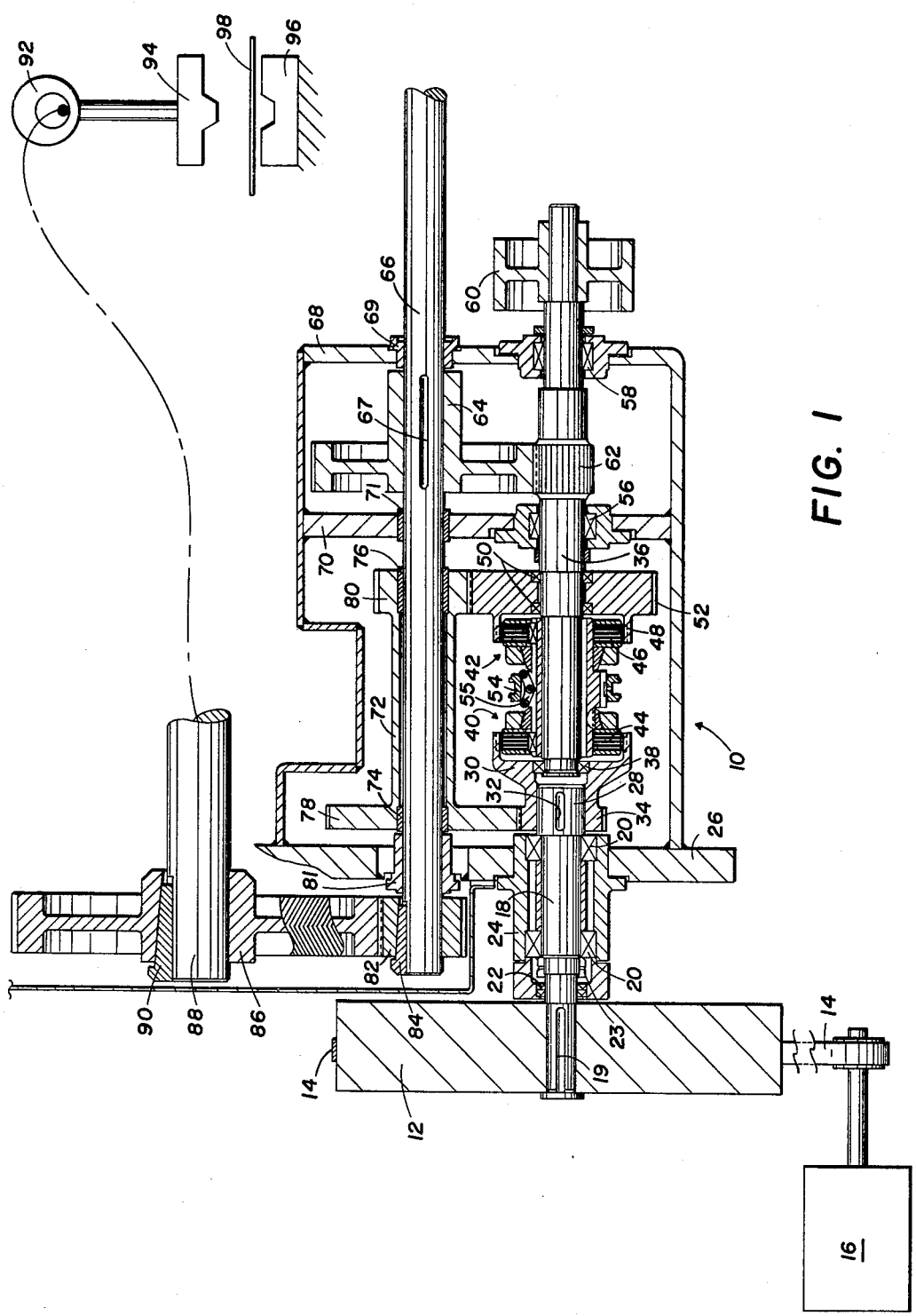
FIGURE 1 illustrates a sectional view of one embodiment of the present transmission used with a press brake.

Referring to FIGURE 1, a preferred embodiment of present mechanical transmission is designated generally by the numeral 10. A flywheel 12 is rotated in a conventional manner by a continuous belt 14 driven by a motor 16. A driving shaft 18 is connected to the flywheel 12 by a key 19 and is journaled in bearings 20. A sealing member 22 is disposed about shaft 18 to retain bearing lubrication. Bearings 20 are retained by locknuts 23 in a support member 24 connected through the main housing wall 26. The end portion 28 of the driving shaft 18 is slightly enlarged in diameter and is connected to a spider 30 by a key 32. The spider 30 includes an integral driving gear 34.

A driven shaft 36 is coaxially aligned with the driving shaft 18 and is journaled at one end in spider 30 by bearing 38. A pair of back-to-back clutches 40 and 42 are keyed to the driven shaft 36. Outer portions of the clutch plates 44 of clutch 40 are engaged by the spider 30 and normally freely rotate with rotation of the spider 30. A spider 48 is rotatably mounted on the driven shaft 36 by bearings 50, and engages the clutch plates 46 of clutch 42 for rotation thereof. A driven gear 52 is integrally connected to the spider 48.

Clutches 40 and 42 may be selectively operated by lateral movement of the actuator 54 which pivots the member 55 and presses the clutch plates of one of the clutches together in the well known manner. The actuator 54 may be operated by a suitable lever, not shown, which extends outside the transmission casing. Only one of the clutches 40 and 42 may be engaged at a time. A suitable back-to-back clutch arrangement may comprise any of a number of commercially available units, such as a mechanically actuated duplex clutch manufactured and sold as Model MTU by the Twin Disc Clutch Company of Racine, Wis.

While a mechanical back-to-back clutch has been illustrated, it will be understood that hydraulically actuated clutches may also be utilized. In such hydraulic clutches, a directional valve is utilized to control the direction of fluid flow to one of two duplex clutches to selectively energize one of the clutches. A suitable hydraulically actuated duplex clutch for use with the present invention is manufactured and sold as Model BC–607 by the Twin Disc Clutch Company of Racine, Wis. A suitable directional hydraulic valve for control of fluid to the hydraulic clutch is the DG4S4 directional valve manufactured and sold by the Vickers Company.

The driven shaft 36 is also journaled in bearings 56 and 58, and includes a brake drum 60 connected to the shaft end. The design of the low inertia duplex clutches 40 and 42 permits the use of a relatively small braking system to brake the rotation of the driven shaft 36. The brake drum 60 is operated upon any suitable conventional braking system such as conventional mechanical drum brake shoes which frictionally engage the brake drum, or alternatively the conventional plate clutch brake system. Examples of suitable braking systems for a press brake are described in U.S. Patent No. 3,306,122, issued on Feb. 28, 1967 to Dehn and U.S. Patent 2,912,084 issued on Nov. 10, 1959 to Meyercordt.

Driven shaft 36 includes an integral gear 62 which meshes with a gear 64. Gear 64 is keyed to an intermediate shaft 66 by a key 67. The intermediate shaft 66 is disposed parallel to both the driving shaft 18 and the driven shaft 36, and is journaled in the outer casing wall 68 by a bearing member 69 and in wall 70 by a bearing 71. An idler member 72 is rotatably mounted on the intermediate shaft 66 on bearings 74 and 76. The idler member 72 includes a first idler gear 78 which meshes with the driving gear 34, and a second idler gear 80 which meshes with the driven gear 52.

The intermediate shaft 66 is journaled in wall 26 by a bearing member 81 and is keyed to a gear 82 by key member 84. Gear 82 meshes with a herringbone gear 86 which is keyed to an output shaft 88 by a key member 90. The intermediate shaft 66 may also include another gear at the opposite end of the shaft (not shown) which operates to drive the output shaft 88.

The output shaft 88 is shown diagrammatically connected to drive a press brake by connection eccentric to the axis of a shaft 92. A die member 94 is pivotally connected to shaft 92 and is vertically reciprocated upon rotation of shaft 92. The die 94 is periodically forced into a mold 96 in order to mold a work piece 98 into a desired shape. It is to be understood that while the preferred embodiment of the invention is particularly advantageous for use with such a workpiece forming system, the invention may also be used in other varied applications.

In operation, the flywheel 12 and the driving shaft 18 are rotated at a constant speed when the motor 16 is energized. When it is desired to rotate the output shaft 88 at a high rate of speed, the mechanical actuator 54 is moved laterally in order to engage clutch 40. The driven shaft 56 is then directly connected to the driving shaft 18 through the spider 30 and the clutch plates 44. Rotation of gear 62 causes rotation of the meshed gear 64 and the intermediate shaft 66. Gear 82 is then rotated to impart rotative motion to the herringbone gear 86 and the output shaft 88. The die 94 is then vertically reciprocated. As clutch 42 is not engaged, the idler member 72 is rotated by the driving gear 34, but the idler gears 78 and 80 do not impart torque to the driven shaft 36.

If a lower speed of rotation is desired for the output shaft 88, the mechanical actuator 54 is laterally moved to disengage clutch 40 and to engage clutch 42. Rotation is then imparted to the driven shaft 36 through the driving gear 34, the first idler gear 78, the second idler gear 80, the driven gear 52, the spider 48, and the clutch plates 46. Due to the relative gear sizes of the idler gears and the driven gear 52, rotation is imparted to the driven shaft 36 at a rate lower than the rate of rotation imparted by directed drive by the driving shaft 18. Rotative motion is provided to the output shaft 88 in the same manner as previously described through the gears 62 and 64 and the intermediate shaft 66.

Because of the novel configuration of the present device wherein portions of the device continuously rotate, only a relatively small braking force is required to provide adequate braking for the output shaft 88. Additionally, because the idler member 72 and the intermediate shaft 66 rotate with respect to one another, the intermediate shaft 66 may be used to gear and drive the output shaft without the requirement of a bulky arrangement of extra driving gears.

Figure 2:
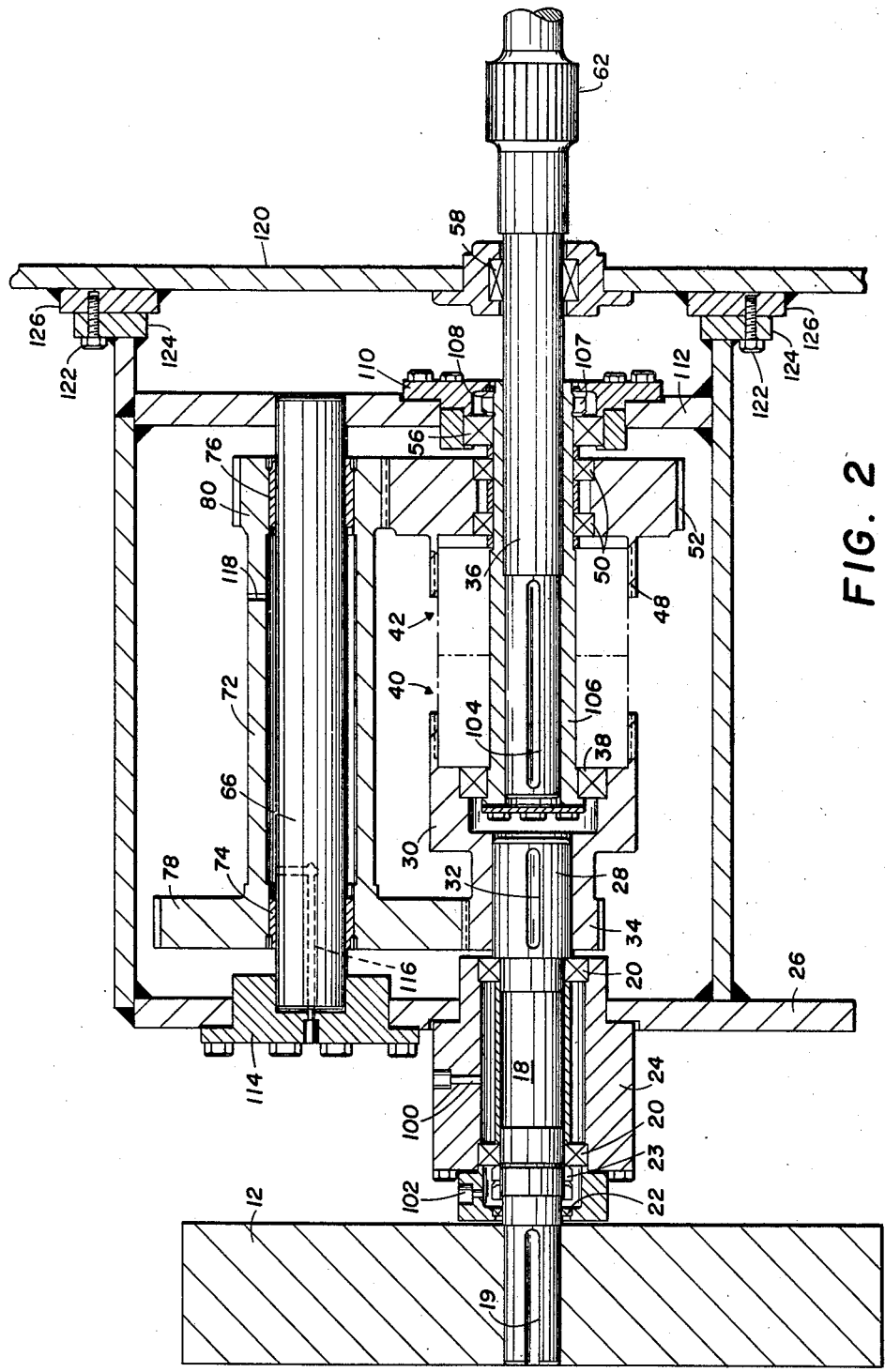
FIGURE 2 illustrates a cross sectional view of a second embodiment of the invention.

Referring now to FIGURE 2, wherein like reference numerals refer to like and corresponding parts previously described, a second embodiment of the present transmission device is illustrated. This embodiment of the invention is somewhat similar to the embodiment previously described, with the exception that the driven shaft 36 does not transmit torque to the intermediate shaft 66, but is rather utilized directly as an output shaft. This embodiment may be advantageously utilized as an "add on" transmission unit for an existing press brake system.

The flywheel 12 is keyed to the driving shaft 18 which is journaled for rotation in the wall 26. Lubrication ports 100 and 102 are provided in order to provide lubrication to the bearings 20 in support member 24.

The driven shaft 36 is connected by key 104 to an end member 106 which is journaled in bearings 38 and 56. A locknut 107 retains bearing 56 on the end member 106. An oil seal 108 is included in a bearing support member 110 which is attached to the wall 112. Clutches 40 and 42 are connected to the end member 106 and are adapted to be selectively operated so that one of the clutches engages the shaft 36 with one of the spiders 30 or 48.

The intermediate shaft 66 is supported in the wall 112 at one end and by a support member 114 at the other end. The idler member 72 is rotatably mounted on the intermediate shaft 66 by means of bearings 74 and 76. A port 116 is defined through the support member 114 and the end of the intermediate shaft 66 to provide lubricating fluid between the idler member 72 and the intermediate shaft 66. A port 118 is defined in the idler member 72 to allow circulation of the lubricating fluid. A hydraulic pump may be connected to the device to continuously circulate lubrication.

The transmission system is adapted to be attached to an existing drive system wall 120. Bolts 122 pass through steel pads 124 welded to the transmission system and abutting with pads 126 welded to wall 120. This embodiment of the transmission system has been found advantageous for allowing gearing changes to be quickly and inexpensively made in existing press brake systems by sliding the transmission system over an extending driven shaft and bolting on the transmission system.

In operation, when it is desired to rotate the driven shaft 36 at a relatively high rate of speed, clutch 40 is engaged and the spider 30 directly connects the driving shaft 18 with the driven shaft 36 for rotation thereof. If a reduced rate of speed is desired, clutch 40 is de-energized and clutch 42 energized. Rotative motion is then transmitted around the clutches through gears 34 and 78, and gears 80 and 52 in order to rotate the spider 48. Spider 48 then rotates the driven shaft 36 through clutch 42 at a reduced rate of speed determined by the gear ratios of the gears 78 and 34 and idler gear 80 and gear 52.

The geometric configuration provided by the present invention enables the bearings for the flywheel 12 to be closely mounted to the flywheel, thus eliminating shaft bending. The provision of the rotating idler member 72 on the intermediate shaft 66 provides an efficient and compact mechanical transmission system.

While the clutches 40 and 42 shown in FIGURES 1 and 2 may be actuated by mechanical means, it has been found advantageous for many purposes to utilize a pair of back-to-back hydraulically actuated clutches. A suitable type of duplex hydraulic clutch is the Model BC–607 clutch manufactured and sold by the Twin Disc Company, of Racine, Wis.

Figure 3:
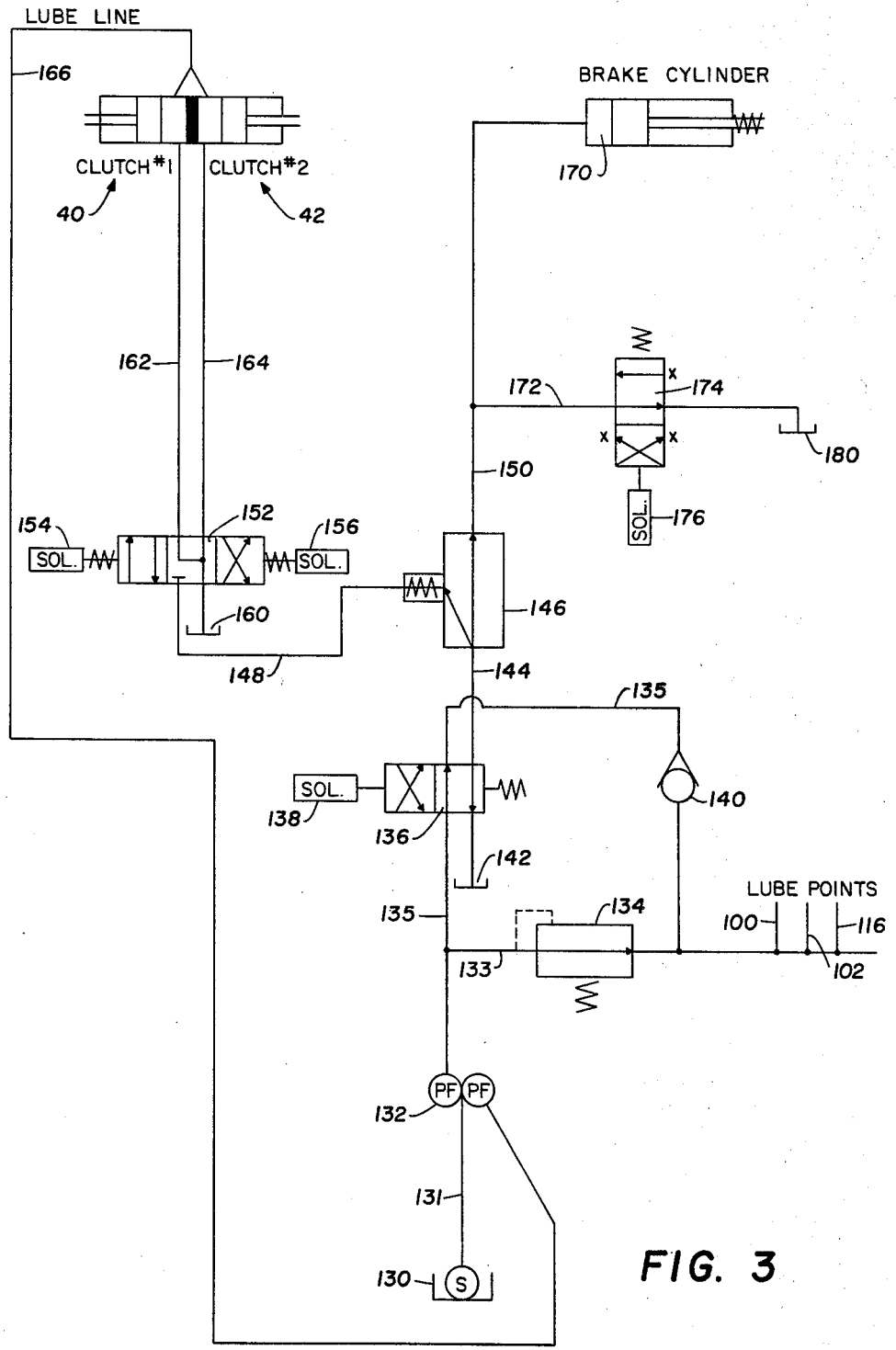
FIGURE 3 illustrates a hydraulic system for operating the embodiment shown in FIGURE 2.

FIGURE 3 illustrates a hydraulic circuit particularly adapted for selective actuation and lubrication of the present transmission system when used in a press brake. A main reservoir 130 of hydraulic fluid is equipped with a suitable oil strainer to provide hydraulic fluid through a line 131 to a constant delivery, vane type double pump 132. Pump 132 may be operated by the flywheel 12 to provide a constant supply of hydraulic fluid through line 133 to a normally closed piston type relief valve 134. When valve 134 is forced to an open position, hydraulic fluid is provided to the transmission system through the ports 100, 102 and 116 previously described (FIGURE 2).

The pump 132 also supplies hydraulic fluid through the line 135 to a two position, four-way valve 136. A solenoid 138 controls the operation of valve 136. In the illustrated position of the valve 136, hydraulic fluid is provided through the line 135 and a check valve 140 to supply hydraulic fluid to the lubrication points 100, 102 and 116.

A return reservoir 142 receives hydraulic fluid drainage from a line 144. A sequence valve 146 controls the passage of fluid from line 144 through lines 148 and 150. Line 148 is connected with a three position, four-way valve 152 which is spring centered and operated by a pair of solenoids 154 and 156. Valve 152 controls the flow of fluid from line 148 to the clutches 40 and 42. A return reservoir 160 receives fluid draining from a pair of lines 162 and 164 which are respectively connected to the hydraulically actuated clutches 40 and 42. Upon selective actuation of solenoid 154, hydraulic fluid is applied from the 148 to clutch 40 for operation of the transmission system at one speed. Upon the alternate actuation of solenoid 156, hydraulic fluid is applied through the line 164 to engage clutch 42 for operation of the transmission system at a second speed. Lubrication is applied to back-to-back clutches 40 and 42 through a line 166 from the double pump 132.

Valve 146 controls the flow of hydraulic fluid through the line 150 in order to selectively operate the spring biased brake cylinder 170 which controls the operation of the braking system for the press brake. A fluid line 172 branches from line 150 and is controlled by a four-way valve 174 operated by a solenoid 176. Fluid passing through the line 172 in the open position of valve 174 is dumped into a return reservoir 180.

When the present transmission system is disengaged, the valves of the hydraulic system are set in the illustrated positions. Hydraulic fluid from the main reservoir 130 is forced by the pump 132 through the line 135 and check valve 140 to the lubrication points 100, 102 and 116 in order to provide lubrication to the transmission system. The brake cylinder 170 is spring biased into engagement with the press brake in order to prevent movement thereof. Any hydraulic fluid in the line 172 is drained into the return reservoir 180 through the valve 174. Hydraulic fluid is also drained through the line 144 and the valve 136 to the return drain 142. Hydraulic fluid is drained from the clutches 40 and 42 through the return drain 160.

When it is desired to actuate the press brake, solenoids 138 and 176 are actuated in order to switch the valves 136 and 174 to their respective illustrated second positions. Hydraulic fluid will thus be supplied by the pump 132 through the line 135 and the valve 136 to the line 144. The flow of fluid through the check valve 140 will thus be temporarily halted, until sufficient pressure builds up in line 133 to open the normally closed relief valve 134. When valve 134 opens, lubrication is again provided to the lube points 100, 102 and 116. Hydraulic fluid is thus supplied through the line 144 to the sequence valve 146, which first applies the fluid through the line 150 to the brake cylinder 170. The actuation of the solenoid 176 blocks the flow of fluid through line 172 to the drain 180, thereby allowing fluid pressure to be supplied through the line 150 in order to overcome the spring bias against the brake cylinder 170 and allowing the press brake to operate.

When sufficient pressure has been applied to the brake cylinder 170 in order to allow operation of the press brake, the sequence valve 146 will divert the flow of fluid from the line 144 to the line 148 and the valve 152.

One of the solenoids 154 or 156 will be energized, depending upon the speed of rotation desired for the press brake. If solenoid 154 is actuated, valve 152 will be switched so that fluid applied through line 148 will flow through line 162 to clutch 40. If a different speed of operation of the press brake is desired, solenoid 156 is actuated to place valve 152 in its third position so that fluid supplied through line 148 is forced through line 164 in order to energize clutch 42.

It will thus be seen that the hydraulic circuit of the present invention may be very advantageously utilized with the present transmission system in a press brake environment. The safety features of the hydraulic circuit are apparent, in that at least two of the hydraulic valves must simultaneously fail before control of the press brake is lost. Additionally, a circuit is provided for the quick release of fluid from the brake cylinder 170 through the reservoir 180, in order that the brake may be very quickly reapplied when it is desired to stop the press brake. The present hydraulic system may be driven by the flywheel 12, and thus an integral "add-on" unit may be applied to existing press brakes without the requirement of additional power supplies and the like.

While the present invention has been described with respect to specific embodiments thereof, it is to be understood that further modifications may be suggested to those skilled in the art and it is intended to cover such modifications as fall within the scope of the appended claims.

What is claimed is:
1. In a plural speed mechanical transmission system, the combination comprising:
 (a) a driving shaft rotated at a first speed,
 (b) a driven shaft coaxially aligned with said driving shaft,
 (c) clutch means connected to the end of said driven shaft adjacent said driving shaft, said clutch means selectively operable to connect said shafts for rotation of said driven shaft generally at said first speed,
 (d) an intermediate shaft rotatably disposed parallel to said driven shaft and including gear means for receiving rotative motion from said driven shaft,

(e) idler gear means concentrically disposed and rotatable about said intermediate shaft and selectively operable in dependence on said clutch means to rotate said driven shaft at a second speed.

2. The combination defined in claim 1 wherein said clutch means comprises:
a first clutch selectively operable for directly connecting said driving shaft to said driven shaft, and
a second clutch selectively operable for connecting said idler gear means to said driven shaft for rotation thereof.

3. The combination defined in claim 2 wherein said clutch means includes actuator means operable to selectively engage one of said clutches.

4. The combination defined in claim 1 and further comprising:
an output shaft disposed parallel to said intermediate shaft and including gear means for receiving rotative motion from said intermediate shaft.

5. In a two speed mechanical transmission system, the combination comprising:
(a) a driving shaft journaled for rotation at a first speed and including a driving gear mounted on one end portion thereof,
(b) a journaled driven shaft coaxially aligned with said driving shaft and including a driven gear rotatably mounted thereon,
(c) clutch means disposed adjacent the end of said driving shaft and connected to the end of said driven shaft,
(d) an intermediate shaft disposed parallel to said driven shaft and including gear means for receiving rotative motion from said driven shaft,
(e) idler means rotatably and concentrically mounted on said intermediate shaft and including a first idler gear engaging said driven gear,
(f) said clutch means selectively operable in one position to directly connect said driving shaft to said driven shaft for rotation thereof at a first speed, and selectively operable in another position to transmit rotative motion from said driving shaft through said idler means for rotation of said driven shaft at a second speed.

6. The combination defined in claim 5 and further comprising:
an output shaft disposed parallel to said intermediate shaft and including gearing means for receiving rotative motion from said intermediate shaft.

7. The combination defined in claim 5 and further comprising:
brake means mounted on the end of said driven shaft and selectively operable to apply braking motion to said driven shaft.

8. The combination of claim 7 and further comprising fluid means for selectively actuating said clutch means and for controlling the operation of said brake means.

9. The combination of claim 8 and further comprising fluid valve means for controlling the operation of said brake means before said clutch means is actuated.

10. The combination of claim 8 and further comprising means for diverting fluid from said fluid means to lubricate said shafts and clutch means.

11. The combination of claim 10 and further comprising means for first directing fluid to operate said brake means and to actuate said duplex clutch means before providing lubrication to said shafts.

12. The combination defined in claim 5 and further comprising:
flywheel means connected to the end of said driving shaft opposite said driven shaft for rotating said driving shaft.

13. The combination of claim 5 wherein said clutch means comprises first and second adjacently disposed clutches.

14. The combination defined in claim 13 and further comprising:
first spider gear means integrally connected to said driving gear and operable in dependency on said first clutch to directly rotate said driven shaft at said first speed.

15. The combination defined in claim 14 and further comprising:
second spider gear means integrally connected to said driven gear and operable in dependency on said second clutch to rotate said driven shaft at said second speed.

16. A hang-on transmission unit for attachment to the existing input shaft of a press system comprising:
(a) a casing adapted to be removably attached to said press system over said input shaft,
(b) sleeve means rotatably journaled within said casing for receiving and keying with said input shaft,
(c) a driving shaft rotated at a constant first speed by a constant speed source, said driving shaft journaled in said casing and coaxially aligned with said input shaft when said casing is attached to said press system,
(d) duplex clutch means disposed about said sleeve means,
(e) first spider gear means connected to said driving shaft and selectively engageable by one of said duplex clutches,
(f) second spider gear means rotatable about said sleeve means and selectively engageable with the other of said duplex clutches, said duplex clutches selectively operable to directly connect said driving shaft with said input shaft to rotate said input shaft at said constant first speed,
(g) gear means disposed parallel to said driving shaft and engaging said spider gear means, said duplex clutches selectively operable for instantaneously transmitting motion from said driving shaft through said gear means to rotate said input shaft at a second speed when said input shaft is under a load.

17. The transmission defined in claim 16 wherein said gear means comprises a pair of spaced apart gears mounted for rotation on the same axis parallel to said driving shaft, each of said gears engaged by one of said spider gear means.

References Cited

UNITED STATES PATENTS

| | | | |
|---|---|---|---|
| 2,567,603 | 9/1951 | Hogue. | |
| 2,912,084 | 11/1959 | Meyercordt | 192—112 |
| 2,983,348 | 5/1961 | Ott | 74—364 |
| 3,306,122 | 2/1967 | Dehn | 192—4 |

ARTHUR T. McKEON, Primary Examiner

U.S. Cl. X.R.

74—364, 369; 192—87